United States Patent

Sawamura et al.

[11] Patent Number: 5,879,266
[45] Date of Patent: Mar. 9, 1999

[54] CONTROL SYSTEM FOR INTERNAL COMBUSTION ENGINES

[75] Inventors: Kazutomo Sawamura; Yoshiharu Saito; Kenichiro Ishii; Shigetaka Kuroda; Akira Kato; Tetsuya Ono; Jun Takahashi; Toru Kitamura, all of Wako, Japan

[73] Assignee: Honda Giken Kogyo Kabushiki Kaisha, Tokyo, Japan

[21] Appl. No.: 786,362

[22] Filed: Jan. 17, 1997

[51] Int. Cl.[6] .................................................. F16H 61/58
[52] U.S. Cl. ........................... 477/62; 477/143; 477/174; 477/144
[58] Field of Search ................................. 477/63, 62, 64, 477/109, 110, 140, 143, 144, 156, 169, 174, 176

[56] References Cited

U.S. PATENT DOCUMENTS

| | | | |
|---|---|---|---|
| 4,662,247 | 5/1987 | Sotoyama et al. | 477/143 X |
| 4,687,083 | 8/1987 | Sotoyama et al. | 477/174 X |
| 4,716,999 | 1/1988 | Tezuka et al. | 477/168 X |
| 5,086,668 | 2/1992 | Fujiwara et al. | 477/161 |
| 5,133,232 | 7/1992 | Kikuchi et al. | 477/120 X |
| 5,417,625 | 5/1995 | Yamaki et al. | 477/109 |
| 5,460,584 | 10/1995 | Kusaka et al. | 477/174 X |
| 5,470,288 | 11/1995 | Palansky et al. | 477/110 |
| 5,476,425 | 12/1995 | Shiraishi et al. | 477/110 X |
| 5,573,476 | 11/1996 | Minowa et al. | 477/159 X |
| 5,603,673 | 2/1997 | Minowa et al. | 477/110 |
| 5,643,137 | 7/1997 | Suzuki | 477/169 |
| 5,672,138 | 9/1997 | Mikami et al. | 477/110 X |
| 5,704,872 | 1/1998 | Kosik et al. | 477/176 X |
| 5,722,912 | 3/1998 | Narita | 477/176 X |

FOREIGN PATENT DOCUMENTS 2-45628   2/1990   Japan.
5-321707 12/1993   Japan.

*Primary Examiner*—Dirk Wright
*Assistant Examiner*—Peter T. Kwon
*Attorney, Agent, or Firm*—Nikaido, Marmelstein, Murray & Oram LLP

[57] ABSTRACT

A control system for an internal combustion engine with an automatic transmission having a torque converter, and a lock-up device. When gear shifting of the automatic transmission is carried out, the output torque of the engine is increased so as to reduce a shock caused by the gear shifting. The engaging force of the lock-up device is changed in response to the increase of the output torque.

19 Claims, 7 Drawing Sheets

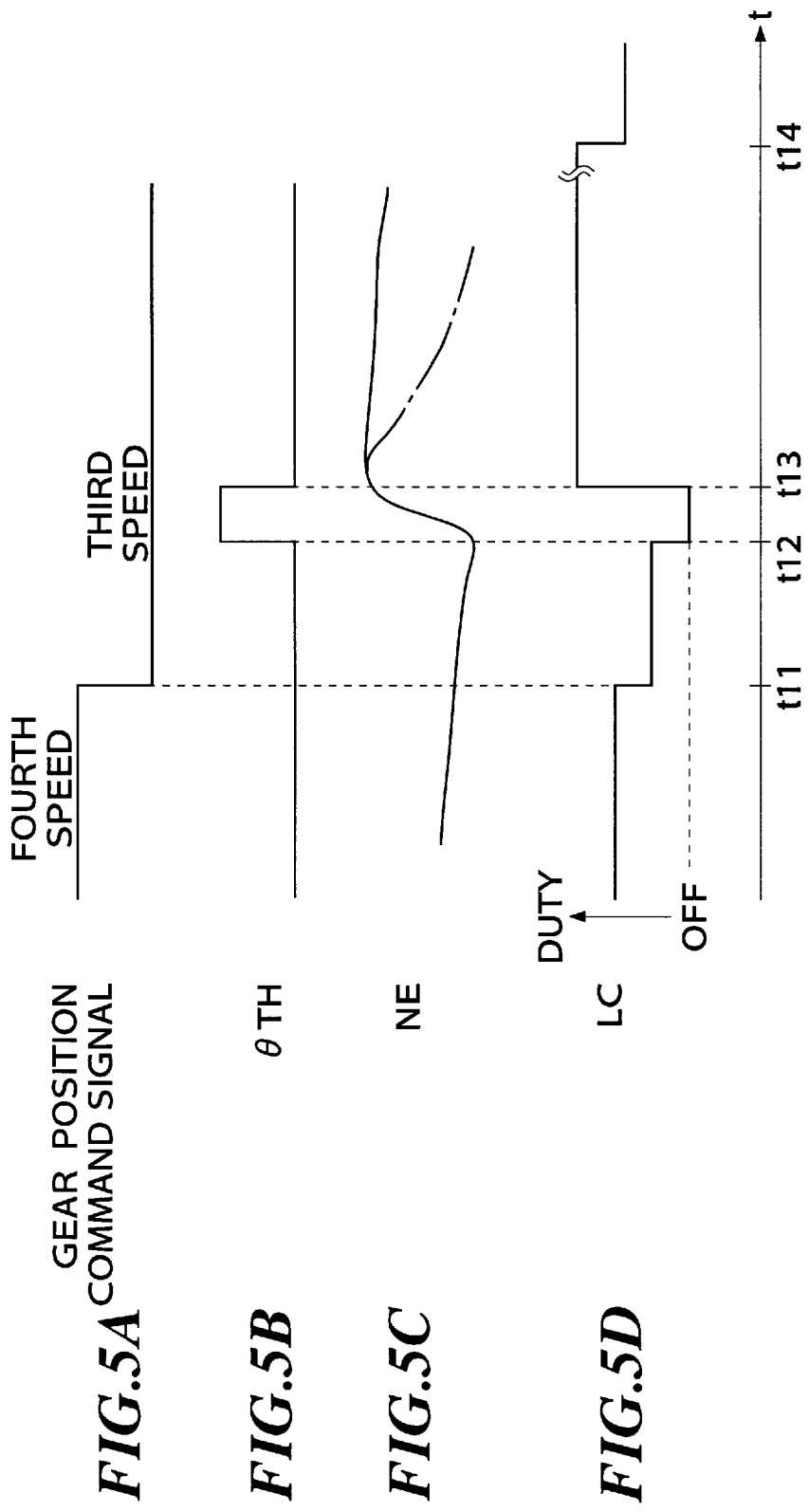

CONTROL SYSTEM FOR INTERNAL COMBUSTION ENGINES

BACKGROUND OF THE INVENTION

1. Field of the Invention

This invention relates to a control system for internal combustion engines, and more particularly to a control system of this kind, which controls the engaging force of a lock-up mechanism of an automatic transmission connected to the engine during gear shifting of the transmission.

2. Prior Art

Conventionally, in an automotive vehicle having an automatic transmission installed therein, a shock is generated during gear shifting due to a difference in rotational speed before and after the gear shifting, which incurs uncomfortableness to the driver. Generally, when an automatic transmission is upshifted, the deceleration of the vehicle once increases to decelerate the vehicle upon issuance of an upshifting command, and then a shock is generated due to the acceleration to accelerate the vehicle. To prevent such a shock, a control system for internal combustion engines for vehicles has been proposed, for example, by Japanese Laid-Open Patent Publication (Kokai) No. 5-321707, which increases the output torque of the engine by controlling a throttle actuator of the engine coupled to a throttle valve when an upshift of an automatic transmission of the engine is carried out, and then reduces the output torque below a value before the upshift, to thereby suppress a change in the acceleration acting to accelerate the vehicle during the upshift and a change in the deceleration to decelerate the vehicle, which precedes the change in the acceleration.

Further, a control system for automatic transmissions of automotive vehicles is known from Japanese Laid-Open Patent Publication (Kokai) No. 2-45628, which increases the output torque of the engine when a downshift of the automatic transmission is carried out, to thereby reduce a shock caused by the downshift.

According to the former prior art technique, however, when the output torque of the engine is increased by the throttle valve of the engine, the torque conversion rate decreases due to a characteristic of a torque converter of the automatic transmission, and hence the rotational speed of the engine increases (blows up), which incurs degraded driving comfortableness to the driver, increased fuel consumption, and increased noise and vibrations.

Further, according to the latter prior art technique which only increases the output torque of the engine during a downshift, upon completion of the downshift, the rotational speed of the engine sharply decreases below a lower limit value above which fuel cut is carried out, which causes starting of fuel supply to the engine, resulting in increased fuel consumption. Moreover, this technique still remains to be improved to effectively carry out engine brake, owing to a slip in the torque converter.

SUMMARY OF THE INVENTION

It is a first object of the invention to provide a control system for internal combustion engines with automatic transmissions, which is capable of reducing a shock caused by gear shifting of the automatic transmission to thereby achieve improved fuel economy and improved driveability.

It is a second object of the invention to provide a control system for internal combustion engines with automatic transmissions, which is capable of reducing a shock caused by an upshift of the automatic transmission, to thereby avoid degradation of driving comfortableness, increased fuel consumption, and increased noise and vibrations.

It is a third object of the invention to provide a control system for internal combustion engines with automatic transmissions, which is capable of reducing a shock caused by a downshift of the automatic transmission, to thereby curtail the fuel consumption and obtain a sufficient engine brake force.

To attain the above objects, the present invention provides a control system for an internal combustion engine with an automatic transmission having a torque converter, and a lock-up device, comprising:

engine output torque-increasing means responsive to gear shifting of the automatic transmission, for increasing output torque of the engine so as to reduce a shock caused by the gear shifting; and engaging force control means responsive to operation of the engine output torque-increasing means, for changing an engaging force of the lock-up device.

To attain the first and second objects, according to a first aspect of the invention, there is provided a control system for an internal combustion engine with an automatic transmission having a torque converter, and a lock-up device, comprising:

engine output torque-increasing means responsive to upshifting of the automatic transmission toward a higher speed position thereof, for increasing output torque of the engine so as to reduce a shock caused by the upshifting; and engaging force control means responsive to operation of the engine output torque-increasing means, for increasing an engaging force of the lock-up device.

Preferably, the engaging force control means first increases the engaging force of the lock-up device and then progressively decreases the increased engaging force.

More preferably, the engaging force control means determining timing of starting the progressive decrease of the increased engaging force of the lock-up device, depending upon engaging states of ones of a plurality of clutches of a gear device of the automatic transmission which take part in the upshifting of the automatic transmission, during the upshifting of the automatic transmission.

Also preferably, the engaging force control means determines a required amount of increase in the engaging force of the lock-up device, depending upon at least one of an amount of increase in the output torque of the engine by the engine output torque-increasing means, rotational speed of the engine, and an upshifting pattern of the automatic transmission selected for the upshifting.

Specifically, the engaging force control means determines a required amount of increase in the engaging force of the lock-up device, depending upon at least one of an operating state of the lock-up device assumed immediately before the upshifting of the automatic transmission, and an upshifting pattern of the automatic transmission selected for the upshifting.

Preferably, the engaging force control means sets timing of starting the increase of the engaging force of the lock-up device to a timing earlier than a timing at which the output torque of the engine starts to be increased by the engine output torque-increasing means.

Preferably, the engine output torque-increasing means comprises means for increasing opening of a throttle valve of the engine.

To attain the first and third objects, according to a second aspect of the invention, there is provided a control system for an internal combustion engine for a vehicle, the engine being equipped with an automatic transmission having a torque converter, and a lock-up device, comprising:

engine output torque-increasing means responsive to downshifting of the automatic transmission toward a lower speed position thereof, for increasing output torque of the engine so as to reduce a shock caused by the downshifting;

rotational speed-detecting means for detecting rotational speed of the engine; and engaging force control means responsive to operation of the engine output torque-increasing means, for decreasing an engaging force of the lock-up device, the engaging force control means increasing the decreased engaging force of the lock-up device when a rate of change in the rotational speed of the engine after starting of the operation of the engine output torque-increasing means drops below a predetermined value.

To attain the first and third objects, according to a fourth aspect of the invention, there is provided a control system for an internal combustion engine for a vehicle, the engine being equipped with an automatic transmission having a torque converter, and a lock-up device, comprising:

engine output torque-increasing means responsive to downshifting of the automatic transmission toward a lower speed position thereof, for increasing output torque of the engine so as to reduce a shock caused by the downshifting; and engaging force control means responsive to completion of operation of the engine output torque-increasing means, for increasing an engaging force of the lock-up device above a value assumed during the operation of the engine output torque-increasing means.

Preferably, the engaging force control means decreases the engaging force of the lock-up device during the operation of the engine output torque-increasing means.

More preferably, the engaging force control means engages the lock-up device with a low engaging force immediately before starting of the operation of the engine output torque-increasing means.

To attain the first and third objects, according to a fifth aspect of the invention, there is provided a control system for an internal combustion engine for a vehicle, the engine being equipped with an automatic transmission having a lock-up device, comprising:

lock-up control means for controlling an engaging force of the lock-up device such that a slip amount of the lock-up device becomes equal to a predetermined desired value when the engine is in a particular operating region;

decelerating state-determining means for determining whether the vehicle is in a predetermined decelerating state;

operating condition-determining means for determining a change in operating state of the vehicle from the particular operating region to a region other than the particular operating region; and engine output torque-increasing means responsive to downshifting of the automatic transmission toward a lower speed position thereof, for increasing output torque of the engine so as to reduce a shock caused by the downshifting;

wherein when the downshifting of the automatic transmission is carried out while the vehicle is determined to be in the predetermined decelerating state, the lock-up control means continues the control of the engaging force of the lock-up device over a predetermined time period from the time the change in the operating state of the vehicle is determined, or over a time period from the time the change in the operating state is determined to the time the operation of the engine output torque-increasing means is started.

The above and other objects, features, and advantages of the invention will be more apparent from the following detailed description taken in conjunction with the accompanying drawings.

BRIEF DESCRIPTION OF THE DRAWINGS

FIGS. 2A to 2J collectively form a timing chart useful in explaining a manner of controlling the operation of a lock-up clutch of the automatic transmission during an upshift, wherein:

FIG. 2A shows a change in a gear shift command signal UP;

FIG. 2B shows a change in a ratio ECL between input rotational speed and output rotational speed of a gear mechanism appearing in FIG. 1;

FIG. 2C shows a change in torque transmitted by a drive shaft appearing in FIG. 1;

FIG. 2D shows a change in engine rotational speed NE;

FIG. 2E shows a change in output torque of the engine;

FIG. 2F shows a change in a driving signal LCA for driving an A solenoid valve appearing in FIG. 1;

FIG. 2G shows a change in a driving signal LCB for driving a B solenoid valve appearing in FIG. 1;

FIG. 2H shows a change in engaging force of the lock-up cutch;

FIG. 2I shows a change in oil pressure applied to a second-position clutch of the gear mechanism; and FIG. 2J shows a change in oil pressure applied to a third-position clutch of the gear mechanism;

FIG. 5A to 5D collectively form a timing chart useful in explaining a manner of controlling the operation of the lock-up clutch during a downshift, wherein:

FIG. 5A shows a change in a gear shift command signal;

FIG. 5B shows a change in throttle valve opening θTH;

FIG. 5C shows a change in the engine rotational speed NE; and

FIG. 5D shows a change in the operation of the lock-up clutch and

DETAILED DESCRIPTION

The invention will now be described in detail with reference to the drawings showing embodiments thereof.

Figure 1:
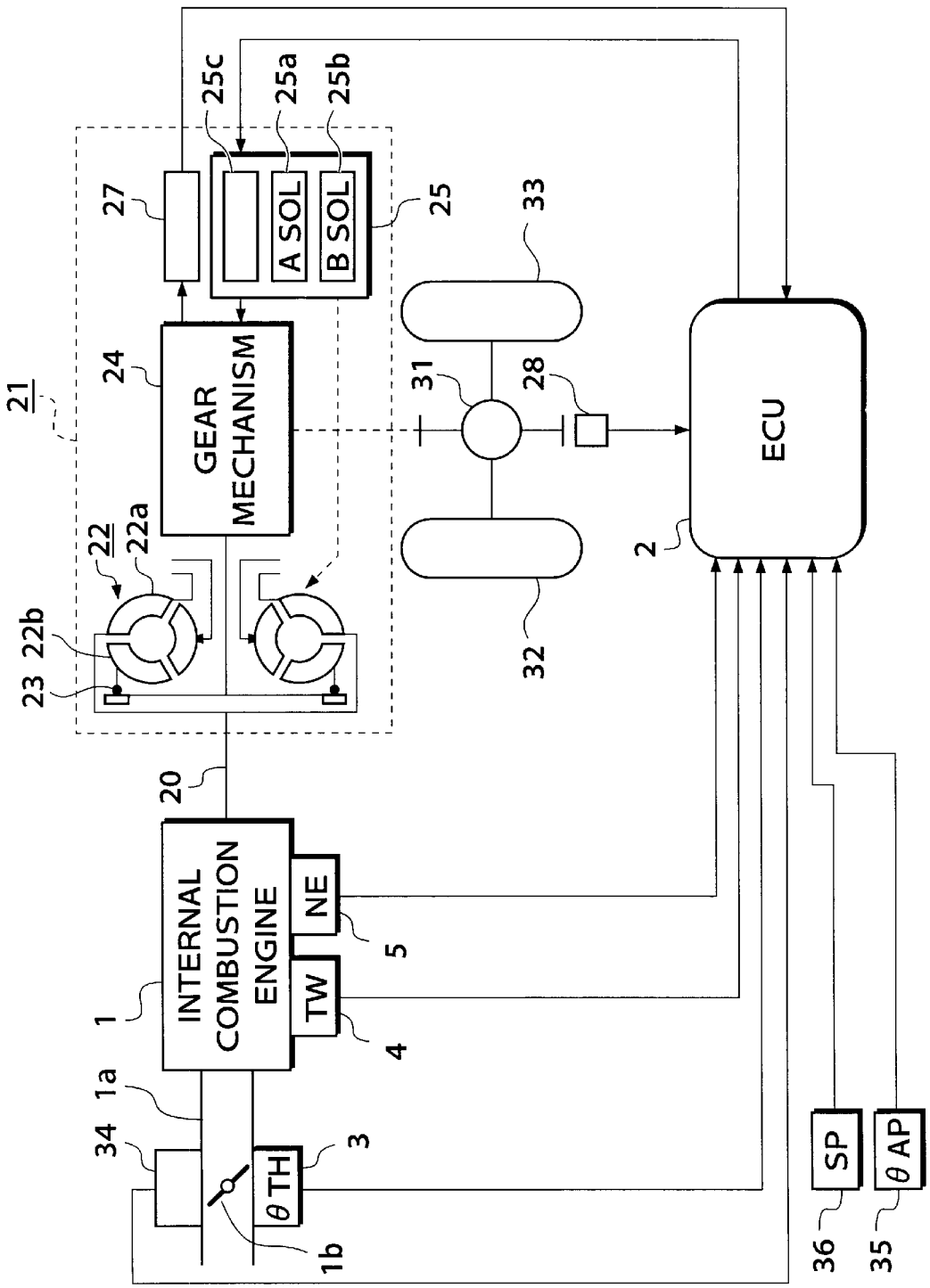
FIG. 1 is a block diagram schematically showing the whole arrangement of an automotive vehicle, in which are installed an internal combustion engine with an automatic transmission and a control system therefor according to a first embodiment of the invention.

Referring first to FIG. 1, there is shown the whole arrangement of an automotive vehicle, on which are installed an internal combustion engine with an automatic transmission and a control system therefor according to an embodiment of the invention, etc. The engine (hereinafter simply referred to as "athe engine") 1 has a crankshaft 20 to which is connected the automatic transmission 21. The automatic transmission 21 is comprised of a torque converter 22 having a pump impeller 22a and a turbine runner 22b, a lock-up clutch 23 for coupling the pump impeller 22a and the turbine runner 22b together, a gear mechanism 24 connected to an output side of the torque converter 22, and a hydraulic control device 25 for controlling the operation of the lock-up clutch 23 and that of the gear mechanism 24. The gear mechanism 24 has an output side thereof connected via a drive shaft 26 to a differential gear mechanism 31. The gear mechanism 24 has transmission gears therein, not shown, which are connected to first to fourth-speed clutches, a main shaft, and a counter shaft.

The hydraulic control device 25 includes an ON-OFF type solenoid valve (hereinafter referred to as "the A solenoid valve") 25a for switching between engagement and disengagement of the lock-up clutch 23, a duty ratio control type solenoid valve (hereinafter referred to as "the B solenoid valve") 25b for controlling the engaging force (engaging force) of the lock-up clutch 23 when the A solenoid valve 25a is energized or open to thereby hold the lock-up clutch 23 in engagement, and a transmission actuator 25c for controlling the gear position (i.e. change gear ratio) of the gear mechanism 24. The A solenoid valve 25a, the B solenoid valve 25b and the transmission actuator 25c are all electrically connected to an electronic control unit (hereinafter referred to as "the ECU") 2 for controlling the automatic transmission 21. The ECU 2 controls the operation of the lock-up clutch 23 by means of the A solenoid valve 25a and the B solenoid valve 25b, and at the same time controls the gear position of the gear mechanism 24 by means of the transmission actuator 25c.

Arranged in the automatic transmission 21 is a gear position sensor 27 which detects the gear position NGRAT of the gear mechanism 24 and supplies an electric signal indicative of the sensed gear position NGRAT to the ECU 2.

Torque output from the engine 1 is transmitted from the crankshaft 20 through the torque converter 22, the gear mechanism 24, the drive shaft 26 and the differential gear mechanism 31 to right and left drive wheels 32, 33 in the mentioned order, thereby driving these wheels. A vehicle speed sensor 28 which detects the vehicle speed VP of the automotive vehicle is arranged on an output side of the automatic transmission 21 for supplying a signal indicative of the sensed vehicle speed VP to the ECU 2.

The engine 1 has a throttle valve opening sensor 3 arranged in an intake pipe 1a of the engine 1, for detecting the valve opening θTH of a throttle valve 1b. The engine 1 is also provided with an engine coolant temperature sensor 4 for detecting engine coolant temperature (TW), and an engine rotational speed sensor 5 for detecting the rotational speed (NE) of the engine 1. Signals from these three sensors are supplied to the ECU 2. The engine rotational speed sensor 5 generates a pulse (hereinafter referred to as "TDC signal pulse") at a predetermined crank angle position of each cylinder of the engine a predetermined angle before a TDC position of the cylinder corresponding to the start of the intake stroke thereof (whenever the crankshaft 20 rotates through 180 degrees in the case of a four-cylinder engine), for supplying a TDC signal pulse to the ECU 2.

Further, the throttle valve 1b is coupled to a throttle actuator 34, which is comprised, e.g. of an electric motor electrically connected to the ECU 2. Further connected to the ECU 2 is an accelerator pedal position sensor 35 which detects the stepping amount (hereinafter referred to as "the accelerator pedal opening") θAP of an accelerator pedal, not shown, of the automotive vehicle, for supplying an electric signal indicative of the sensed accelerator pedal opening θAP to the ECU 2. The ECU 2 controls the throttle valve opening θTH in response to signals indicative of the accelerator pedal opening θAP, etc. That is, in the present embodiment, the accelerator pedal and the throttle valve 1b are not mechanically connected to each other, but the throttle valve opening θTH is controlled based on the accelerator pedal opening θAP detected by the accelerator pedal position sensor 35 and other operating parameters of the engine.

Further, a shift position sensor 36 which detects a shift lever position for selecting an operating mode of the automatic transmission 21 is connected to the ECU 2, for supplying a signal indicative of the sensed shift lever position to the same. In the present embodiment, the automatic transmission 21 is provided with D4 and D3 ranges as drive ranges. In the D4 range, the gear position of the gear mechanism 24 is automatically selected within a range of the first-speed position to the fourth-speed position, and in the D3 range, the gear position is automatically selected within a range of the first-speed position to the third-speed position.

Further, the ECU 2 is connected to another electronic control unit, not shown, for controlling the operation of the engine 1, which controls the amount of fuel supplied to the engine 1 (i.e. valve opening periods of fuel injection valves), ignition timing, and so forth. The ECU 2 and the electronic control unit for controlling the engine operation transmit information on control parameters to each other.

The ECU 2 is comprised of an input circuit having the functions of shaping the waveforms of input signals from various sensors, shifting the voltage levels of sensor output signals to a predetermined level, converting analog signals from analog output sensors to digital signals, and so forth, a central processing unit (hereinafter referred to as "the CPU"), a memory device comprised of a ROM storing various operational programs which are executed by the CPU and various maps, referred to hereinafter, and a RAM for storing results of calculations from the CPU, etc., and an output circuit which outputs and delivers driving signals to the A solenoid valve 25a, the B solenoid valve 25b and the transmission actuator 25c. The ECU 2 operates in response to the above-mentioned signals from the sensors to control the operation of the lock-up clutch 23, the gear position, and the throttle valve opening θTH. Programs described below with reference to flowcharts are executed by the CPU of the ECU 2.

FIGS. 2A to 2J collectively form a timing chart useful in explaining a manner of controlling the operation of the lock-up clutch 23 of the automatic transmission 21 during an upshift of the transmission (hereinafter referred to as "the LC control"). The LC control will be described hereinbelow with respect to the case where the transmission is upshifted from the second-speed position to the third-speed position.

In FIGS. 2A to 2J, when a gear shift command signal (upshifting signal) UP which commands upshifting from the second-speed position to the third-speed position is delivered from the ECU 2 to the transmission actuator 25c at a time point t1, oil pressure applied to the second-speed clutch of the gear mechanism 24 becomes lower, as shown in FIG. 2I, and at the same time oil pressure applied to the third-speed clutch starts to increase, as shown in FIG. 2J. Thus, the second-speed clutch starts to slip and at the same time the third-speed clutch starts to be engaged at a time point t3, so that the second-speed clutch and the third-speed clutch are brought into a so-called "simultaneous engaging state" (torque phase) in which the clutches are both engaged while slipping. This "simultaneous engaging state" continues until a time point t4. After the time point t4, the second-speed clutch becomes completely disengaged and the thirdspeed clutch is increased in engaging force while slipping to be completely engaged at a time point t6 (see FIGS. 2I and 2J). A manner of determining the time point t4 will be described hereinafter.

If no control is made of the engine torque (FIG. 2E) after the time point t4, the torque transmitted by the drive shaft 26 undergoes fluctuations, as shown by the broken line in FIG. 2C, such that the torque decreases between the time point t3 and the time point t4, increases between the time point t4 and a time point t5, and again decreases after the time point t6.

To offset the torque fluctuations of the drive shaft 26 indicated by the broken line in FIG. 2C, the engine torque is controlled so that the torque transmitted by the drive shaft 26 becomes constant, as indicated by the solid line in FIG. 2C, in the following manner: The engine torque starts to be increased at the time point t3 (FIG. 2E), then sharply decreased at the time point t4 at which the second-speed clutch becomes completely disengaged, followed by increasing the same at and after the time point t6 at which the engagement of the third-speed clutch is completed. According to the present embodiment, the engine torque is increased by means of the throttle actuator 34, i.e. by increasing the opening θTH of the throttle valve 1b.

A required increase in the amount of the engine torque can be estimated by simulation or experimental data, depending on an output from the engine assumed immediately before execution of the control for increasing the engine output, and a selected one of upshifting patterns (from the first-speed position to the second-speed position, from the second-speed position to the third-speed position, and from the third-speed position to the fourth-speed position).

The time point at which the engine torque is to start to be increased (i.e. the time point t3 in FIG. 2E) is set to a time point at which a predetermined time period ΔTe (t3–t1) counted by an engine torque control delay timer has elapsed after the gear shift command signal UP was generated at the time point t1.

If the engine torque is changed, as shown in FIG. 2E, so as to make constant the torque transmitted by the drive shaft 26 (FIG. 2C), however, the engine rotational speed NE blows up to become excessive, as indicated by the broken line in FIG. 2D. This spoils the driving comfortableness of the driver and incurs increased noise and vibrations and degraded fuel economy.

To suppress the blow-up of the engine rotational speed NE during an upshift, according to the present embodiment, the engaging force (engaging pressure) of the lock-up clutch 23 is increased from the time point t3 at which the blow-up of the engine rotational speed NE starts, as shown in FIG. 2H. More specifically, at the time point t2, a driving signal LCA for driving the A solenoid valve 25a is turned on, and a driving signal LCB for driving the B solenoid valve 25b is set to a duty ratio of 100%, as shown in FIGS. 2F and 2G. As a result, upon the lapse of a predetermined time period ΔTl of a lock-up clutch control delay timer LCBTMR from the generation of the gear shift command signal UP, the A solenoid valve 25a and the B solenoid valve 25b start their operations, as shown in FIGS. 2F and 2G. The duty ratio of the driving signal LCB for the B solenoid valve 25b is gradually increased, as shown in FIG. 2G, to thereby prevent a sharp increase in the engaging force of the lock-up clutch 23. The increase of the engine torque (FIG. 2E) is carried out by changing the opening θTH of the throttle valve 1b by means of the throttle actuator 34 when the predetermined time period ΔTe set by the engine torque control delay timer has elapsed, i.e. at the time point t3. On the other hand, the increase of the engaging force of the lock-up clutch 23 is delayed by a response lag peculiar to the hydraulic control system, and therefore the operations of the A solenoid valve 25a and the B solenoid valve 25b are started at the time point t2, i.e. slightly before the time point t3. The predetermined time period ΔTl set by the lock-up clutch control delay timer LCBTMR is set such that the increase of the engaging force of the lock-up clutch 23, shown in FIG. 2F, coincides with the increase of the engine torque, shown in FIG. 2E. Thus, the lock-up clutch 23 is engaged to absorb fluctuations in the output torque of the engine, to thereby suppress an increase in the engine rotational speed NE.

A required increase in the engaging force of the lock-up clutch 23 is determined depending on the increase in the output torque of the engine, the engine rotational speed NE, and the selected one of the upshifting patterns (from the first-speed position to the second-speed position, from the second-speed position to the third-speed position, and from the third-speed position to the fourth-speed position). Basically, for example, the required increase in the engaging force of the lock-up clutch 23 is set to a larger value, as the increase in the output torque of the engine is larger, the engine rotational speed NE is lower, and/or as the gear position to be upshifted is a lower-speed position. In actuality, the required increase in the engaging force of the lock-up clutch 23 is determined from a table or a map according to the operating state (on/off) of the lock-up clutch 23 immediately before generation of the gear shift command signal UP and the selected upshifting pattern, the table or map being experimentally prepared.

The duty ratio of the driving signal LCB for the B solenoid valve 25b is progressively decreased from 100% after the time point t4, in order to avoid fluctuations in the engine rotational speed NE due to a sharp decrease in the engaging force of the lock-up clutch 23. The time point at which the increase of the engaging force of the lock-up clutch 23, shown in FIG. 2H, is to be completed, coincides with the time point at which the control for increasing the engine torque, shown in FIG. 2E, is completed, i.e. the time point t4. At the time point t4, the second-speed clutch becomes disengaged, as shown in FIG. 2I, while the third-speed clutch is brought into an engaged state where the slip amount is below a predetermined value (i.e. inertial phase), as shown in FIG. 2J.

Next, a manner of determining the time point t4 will be described with reference to FIG. 2B. FIG. 2B shows a change in a value ECL (Nm/Nc×r) with the lapse of time, which is obtained by multiplying a ratio of the rotational speed Nm of the main shaft to the rotational speed Nc of the counter shaft of the gear mechanism 24, by the change gear ratio r at each gear position. The ECL value is calculated for each transmission mode (each gear position), and the ECL value in each transmission mode assumes 1 when the selected clutch of the gear mechanism 24 is fully engaged. When the selected clutch slips, the ECL value assumes a value more different from 1 as the slip amount of the clutch increases.

When the second-speed clutch starts to be disengaged, i.e. enters the inertial phase upon upshifting from the second-speed position to the third-speed position, the load on the engine decreases to increase the rotational speed Nm of the main shaft, and accordingly the ECL value in the second-speed mode becomes larger, as shown in FIG. 2B. It is determined that the time point t4 has been reached when the ECL value in the second-speed mode becomes equal to a predetermined value, e.g. 1.05. At the time point t4, the ECL calculation mode is switched from the second-speed calculation mode to the third-speed calculation mode.

When it is determined at the time point t4 that the second-speed clutch is disengaged and at the same time the third-speed clutch is engaged, the engine torque is sharply decreased (FIGS. 2E, 2I and 2J).

Next, at the time point t5, the A solenoid valve 25a is deenergized (FIG. 2F) and the duty ratio of the driving signal LCB for the B solenoid valve 25b is reduced to 0% (FIG. 2G), to thereby disengage the lock-up clutch 23. Further, at the time point t6 when a predetermined time period has elapsed from the time point t5, the third-speed clutch is completely engaged, to complete the upshift.

Although in the present embodiment the time point t4 is determined based on the ECL value, this is not limitative, but it may be determined based on the count value of a timer which is set when the gear shift command signal UP is generated (at the time point t1).

Although in the embodiment the engine torque is controlled by changing the throttle valve opening θTH by means of the throttle actuator 34, it may be controlled by changing the ignition timing θig or the fuel injection amount FI. However, to secure satisfactory fuel economy, good exhaust emission characteristics, prevent knocking, and secure required responsiveness of the engine torque when the increased amount thereof is large, it is desirable to control the engine torque by changing the throttle valve opening θTH by means of the throttle actuator 34, as in the present embodiment.

Figure 3:
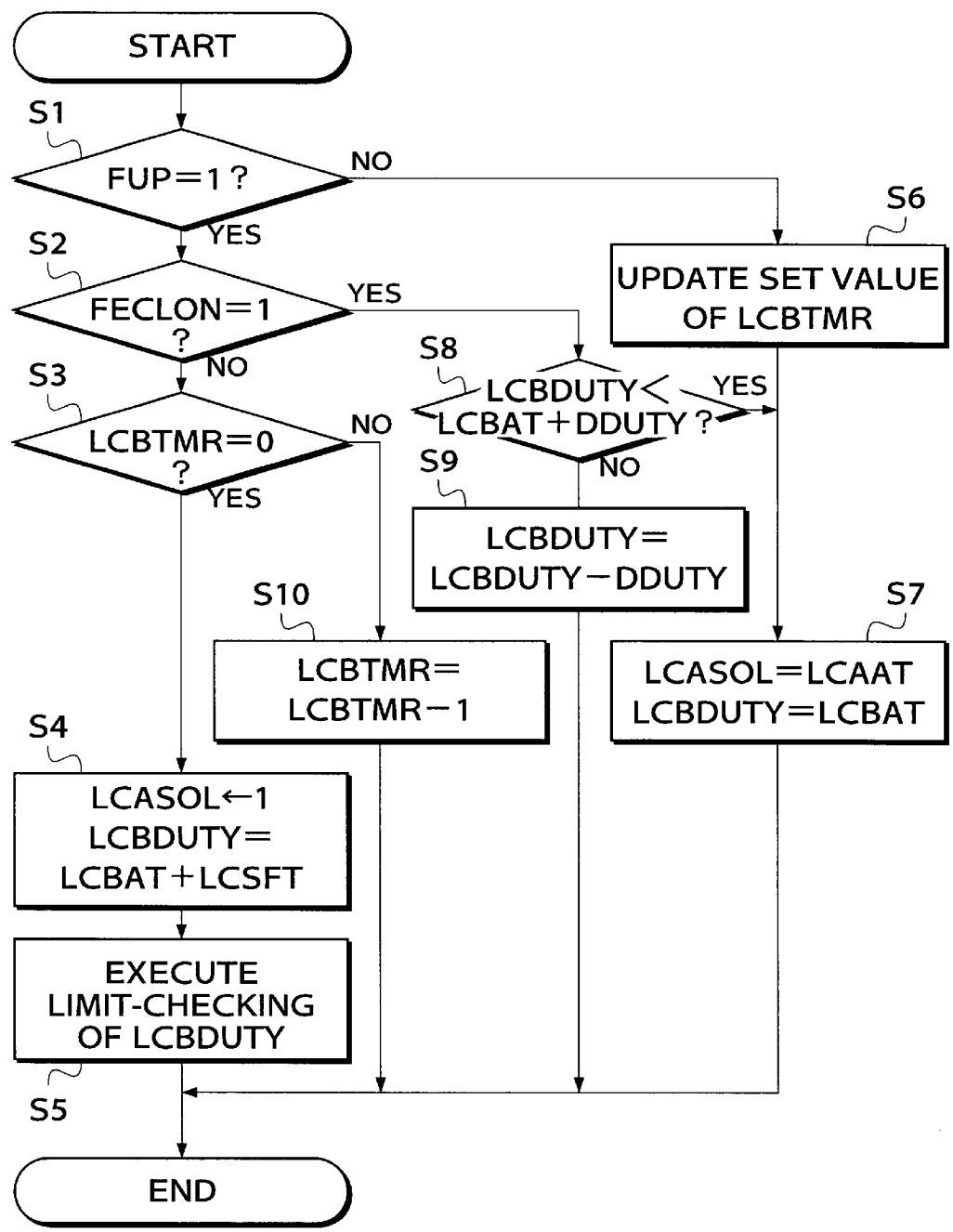
FIG. 3 is a flowchart showing a program for controlling the operation of the lock-up clutch during an upshift.

Next, a manner of increasing the engaging force of the lock-up clutch 23 will be described with reference to FIG. 3, which shows a program for carrying out the LC control during an upshift of the automatic transmission, according to the present embodiment.

First, at a step S1, it is determined whether or not a gear shift-on flag FUP is equal to "1". The flag FUP, when set to "1", indicates that the gear shift command signal UP is at a high level. If the answer is affirmative (YES), i.e. if the flag FUP is equal to "1", which means that the gear shift command signal UP is at the high level (time point t1 in FIG. 2A), then it is determined at a step S2 whether or not an ECL-on flag FECLON which, when set to "1", indicates that the ECL calculation mode has been switched from the second-speed calculation mode to the third-speed calculation mode, is equal to "1".

If the answer is negative (NO), i.e. if the ECL-on flag FECLON is equal to "0", which means that the ECL calculation mode has not yet been switched from the second-speed calculation mode to the third-speed calculation mode, it is determined at a step S3 whether or not the count value of the lock-up clutch control delay timer LCBTMR for counting the predetermined time period ΔT1 is equal to "0". If the count value is equal to 0, i.e. the time point t2 in FIG. 2F has been reached, a lock-up clutch operation flag FLCASOL which, when set to "1", indicates that the A solenoid valve 25a is operating, is set to "1", and at the same time a duty ratio increment LCSFT is added to a duty ratio command value LCBAT for controlling the lock-up clutch 23, to thereby set the resulting sum as a duty ratio LCBDUTY for the B solenoid valve 25b at a step S4. The duty ratio command value LCBAT for the lock-up clutch 23 is determined from a lock-up map according to engine operating parameters.

Next, limit-checking is made of the above calculated duty ratio LCBDUTY of the B solenoid valve 25b at a step S5. Specifically, if the duty ratio LCBDUTY exceeds 100%, the LCBDUTY value is set to 100 %, whereas if it does not exceeds 100%, the LCBDUTY value is maintained as it is, followed by terminating the present routine.

On the other hand, if the answer to the question of the step S1 is negative (NO), i.e. if the gear shift-on flag FUP is not equal to "1", which means that the gear shift command signal UP is not at the high level (before the time point t1 or after the time point t6 in FIG. 2A), the predetermined time period ΔT1 set to the lock-up clutch control delay timer LCBTMR is updated based on an on/off command value LCAAT for the A solenoid valve 25a for controlling the lock-up clutch 23 and a table value determined according to the engine rotational speed NE, at a step S6. Next, the on/off state (LCASOL) of the A solenoid valve 25a is controlled based on the on/off command value LCAAT to control the ON/OFF state of the lock-up clutch 23, and the duty ratio LCBDUTY for the B solenoid valve 25b is controlled based on the duty ratio command value LCBAT to control the engaging force of the lock-up clutch 23 at a step S7, followed by terminating the present routine.

If the answer to the question of the step S2 is affirmative (YES), i.e. if the ECL-on flag FECLON is equal to "1", which means that the ECL-calculation mode has been switched from the second-speed calculation mode to the third-speed calculation mode (at the time point t4 in FIG. 2B), it is determined at a step S8 whether or not the duty ratio LCBDUTY for the B solenoid valve 25b is smaller than the sum of the duty ratio command value LCBAT of the B solenoid valve 25b and a duty ratio decrement DDUTY for the B solenoid valve 25b, and if the LCBDUTY value is equal to or larger than the sum, the duty ratio decrement DDUTY is subtracted from the duty ratio LCBDUTY of the B solenoid valve 25b in order to progressively decrease the B solenoid duty ratio LCBDUTY at a step S9, followed by terminating the present routine. If the answer to the question of the step S8 is affirmative (YES), i.e. if the duty ratio LCBDUTY of the B solenoid valve 25b is smaller than the sum of the duty ratio command value LCBAT and the duty ratio decrement DDUTY, it is determined that the progressive decrease in the duty ratio of the B solenoid valve 25b has been completed, and then the program proceeds to the step S7, wherein the on/off state (LCASOL) of the A solenoid valve 25a is controlled based on the on/off command value LCAAT and the duty ratio LCBDUTY of the B solenoid valve 25b is controlled based on the duty ratio command value LCBAT, followed by terminating the present routine.

Figure 2:
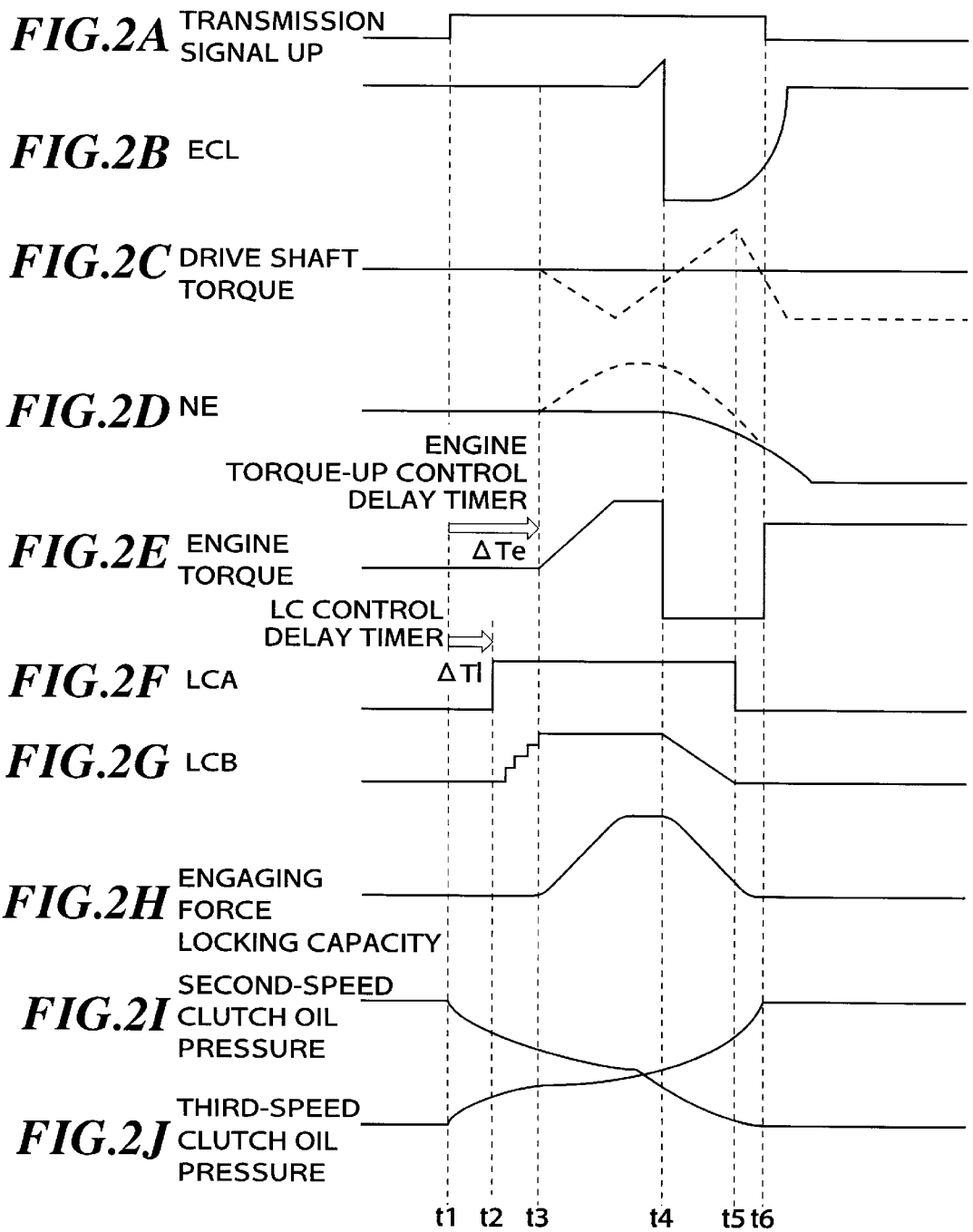

If the answer to the question of the step S3 is negative (NO), i.e. if the count value of the lock-up clutch control delay timer LCBTMR is not equal to "0", which means that the time point t2 in FIG. 2 has not been reached, the count of the lock-up clutch control delay timer LCBTMR is decremented by "1", followed by terminating the present routine.

According to the present embodiment, as described above, when the output torque of the engine 1 is increased (at the time point t3 in FIG. 2) to reduce a shock caused by a gear shift during an upshift of the gear mechanism 24, the engaging force of the lock-up clutch 23 is increased. As a result, it is not only possible to reduce a shock caused by a gear shift but also prevent degraded driving comfortableness, degraded fuel economy, and increased noise and vibrations.

Next, description will be made of downshift control by a control system for internal combustion engines with automatic transmissions, according to a second embodiment of the invention. The arrangement of the control system is identical with that of the control system of FIG. 1 according to the first embodiment, and therefore description thereof is omitted.

Figure 4A:
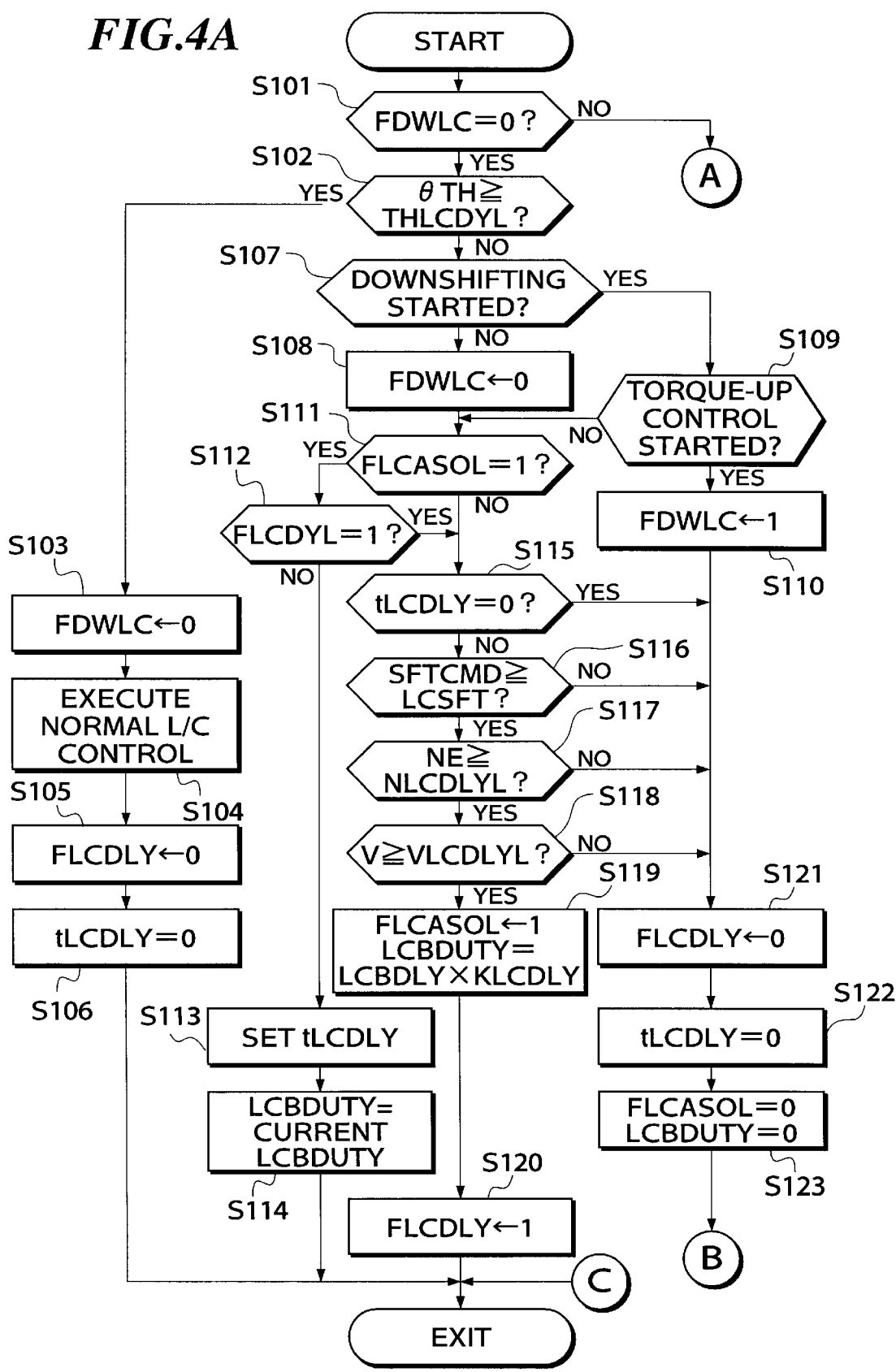
FIG. 4A is a flowchart showing a program for controlling the operation of the lock-up clutch during a downshift, according to a second embodiment of the invention.
Figure 4B:
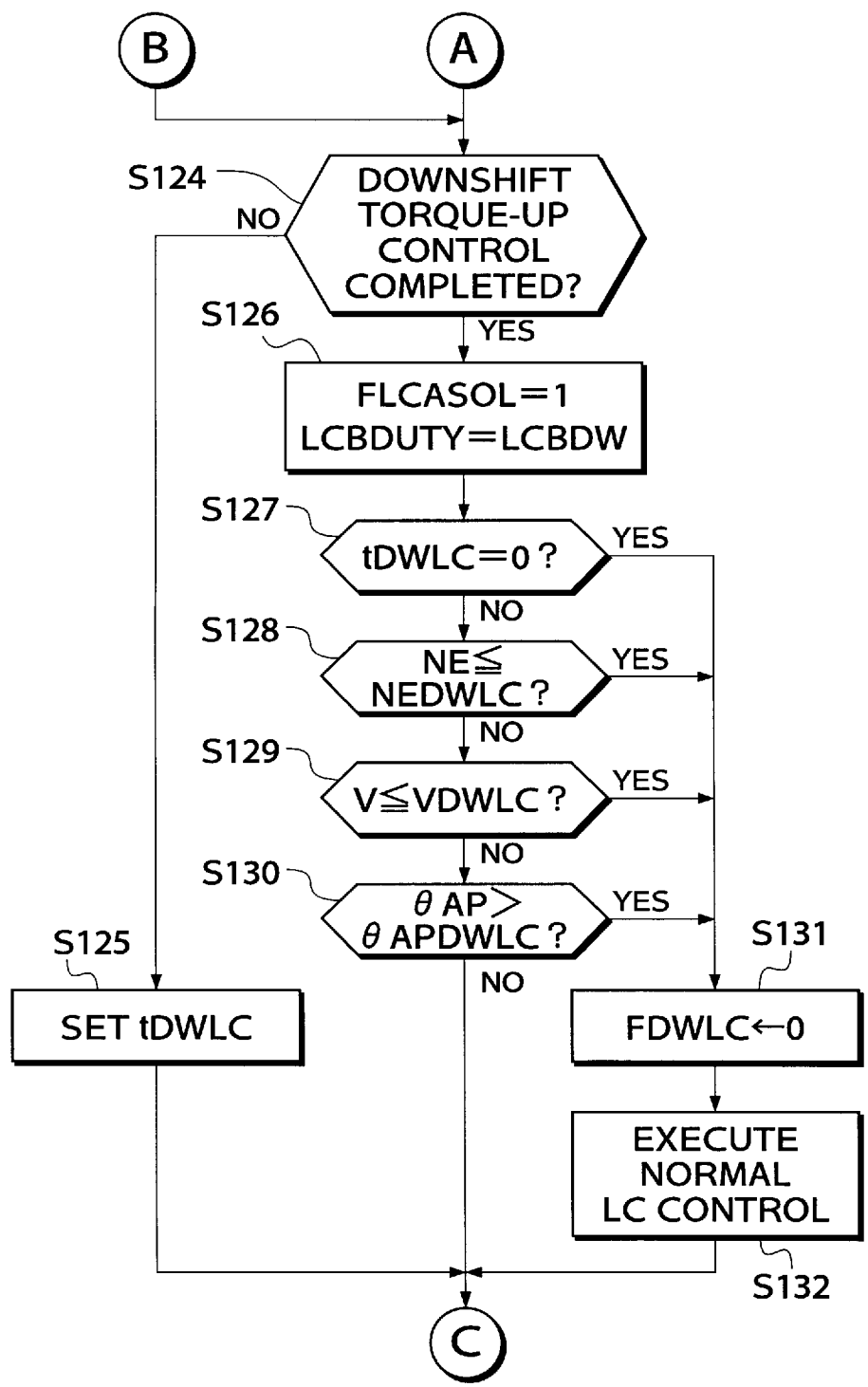
FIG. 4B is a continued part of the flowchart of FIG. 4A.

FIGS. 4A and 4B show a program carrying out the LC control during a downshift, according to the second embodiment, which is executed at predetermined time intervals (e.g. 80 msec).

First, at a step S101, it is determined whether or not a downshift LC flag FDWLC which, when set to "1", indicates that the LC control is being carried out due to a downshift during deceleration of the vehicle, is equal to "0". If FDWLC=0 holds, i.e. if the LC control due to a downshift during deceleration of the vehicle is not being carried out, it is determined at a step S102 whether or not the throttle valve opening θTH is larger than a predetermined value THLDLY (e.g. 1.5 degrees). If θTH≧THLDLY holds, the downshift LC flag FDWLC is set to "0" at a step S103, and normal LC control is carried out at a step S104. Then, at a step S105, a delay flag FLCDLY which, when set to "1", indicates that delay control is being carried out, is set to "0", and the count value of a down-counting timer tLCDLY for counting a delay control execution time period is reset to "0" at a step S106, followed by terminating the present routine.

The normal LC control is carried out, for example, as follows: First, a desired value of a slip amount e of the lock-up clutch 23 (the ratio between the input rotational speed of the torque converter 22 and the output rotational speed of the same) is determined from a map which is set according to the throttle valve opening θTH and the vehicle speed V as vehicle operating parameters. Then, the duty ratio of the B solenoid valve 25b is adjusted such that the actual slip amount e is equal to the desired value, to thereby control the engaging force of the lock-up clutch 23. Details of the normal LC control is described, e.g. in Japanese Laid-Open Patent Publication (Kokai) No. 8-128523.

On the other hand, if θTH<THLDLY holds at the step S102, i.e. if the engine and hence the vehicle is in a predetermined decelerating condition, it is determined at a step S107 whether or not a downshift has been started, which means that the CPU has generated a downshift command signal at a low level. The CPU of the ECU 2 generates the downshift command signal, based on a gear position map which is set according to the vehicle speed V and the throttle valve opening θTH. Therefore, the determination at the step S107 is carried out based on a flag indicative of generation of the downshift command signal.

If the answer to the question of the step S107 is negative (NO), which means that no downshift has been started, the downshift LC flag FDWLC is set to "0" at a step S108, and then it is determined at the step Sill whether or not the lock-up flag FLCASOL is equal to "1".

If FLCASOL=1 holds at the step S111, it is determined at a step S112 whether or not the delay flag FLCDLY is equal to "1". When this question is first made, FLCDLY=0 holds, and then the program proceeds to a step S113, wherein the down-counting timer tLCDLY is set to a predetermined time period TLCDLY (e.g. 2 to 3 sec) and started. Then, at a step S114, the control duty ratio LCBDUTY of the B solenoid valve 25b is set to a present value of the LCBDUTY value (equal to a last value thereof), followed by terminating the program.

On the other hand, if FLCASOL=0 holds at the step S111, e.g. when the engine coolant temperature TW is low, when the engine rotational speed NE is in the vicinity of the idling rotational speed, when the shift lever position is in a range other than D4 and D3, or when a rate of change in the engine rotational speed NE exceeds a predetermined value, it is determined at a step S115 whether or not the count value of the timer tLCDLY set at the step S113 is equal to "0". If tLCDLY>0 holds, the program proceeds to a step S116, wherein it is determined whether or not a command signal SFTCMD for the gear position indicates a predetermined gear position LCSFT (e.g. third-speed position) or a higher speed position. If SFTCMD≧LCSFT holds, it is determined at a step S117 whether or not the engine rotational speed NE is larger than a predetermined LC delay lower limit value NLCDLYL (e.g. 700 rpm). If NE≧NCLDLYL holds, it is determined at a step S118 whether or not the vehicle speed V is higher than a predetermined LC delay lower limit value VLCDLYL (e.g. 10 km/h).

If tLCDLY>0 holds and at the same time the answers to the questions of the steps S116 to S118 are all affirmative (YES), the lock-up flag FLCASOL is set to "1" to engage the lock-up clutch 23, and the control duty LCBDUTY of the B solenoid valve 25b is set to a value obtained by multiplying a normal value LCBDLY by a predetermined coefficient KLCDLY (e.g. 0.5) at a step S119. Then, the delay flag FLCDLY is set to "1" at a step S120, followed by terminating the present routine. In other words, when the throttle valve is almost fully closed, if the conditions of the gear position command signal value SFTCMD, the engine rotational speed NE, and the vehicle speed V are all satisfied (steps S116 to S118), the lock-up clutch 23 is controlled so as to be engaged with an engaging force smaller than a normal engaging force. Thus, a sharp drop in the engine rotational speed NE can be prevented.

It is desirable that the predetermined coefficient KLCDLY is set based on the vehicle speed V, the engine rotational speed NE, etc. with the engine brake force and the decelerating force of the vehicle taken into account.

Thereafter, if the program proceeds from the step S111 through the S112 to the step S115, wherein it is determined that the predetermined time period TLCDLY has elapsed without a downshift being started so that tLCDLY=0 holds at the step S115, or if any of the answers to the questions of the steps S116 to 118 is negative (NO), the delay flag FLCDLY is set to "0" at a step S121, and then the timer tLCDLY is reset to "0" at a step S122. Then, at a step S123 the lock-up flag FLCASOL is set to "0" and the control duty ratio LCBDUTY of the B solenoid valve 25b is set to "0", to disengage the lock-up clutch 23, followed by the program proceeding to a step S124 in FIG. 4B.

On the other hand, if a downshift is started, i.e. if the downshift command signal is generated at the low level (see a time point t11 in FIG. 5A), the program proceeds from the step S107 to a step S109, wherein it is determined whether or not torque-up control (control for increasing the torque during a downshift) has been started, which is executed in synchronism with operation of the transmission clutch of the gear mechanism 24 during a downshift. The torque-up control during a downshift is carried out based on the ratio between the input rotational speed of the gear mechanism 24 and the output rotational speed thereof. More specifically, in the case where a downshift from the fourth-speed position to the third-speed position is effected, the torque-up control is started by opening the throttle valve 1b, as indicated at a time point t12 in FIG. 5B when the actual ECL value starts to deviate from an ECL value for the fourth-speed position, i.e. when the fourth-speed clutch starts to be disengaged, which means that the fourth-speed clutch has entered the inertial phase. Then, when the actual ECL value becomes equal to an ECL value for the third-speed position, i.e. when the third-speed clutch starts to be engaged, the torque-up control is terminated, as indicated at a time point t13 in FIG. 5B. The timing of start and termination of the downshifting torque-up control can be determined from a downshift torque-up control flag which is set by processing, not shown, executed by the CPU of the ECU 2. The timing of start and termination of the downshift torque-up control may be determined not based on the rotational speed ratio ECL but on a time period elapsed from the time of generation of the downshift command signal. Further, in the present embodiment, the torque-up control is effected by stepwise opening and closing the throttle valve 1b by means of the throttle valve actuator 3 (see FIG. 5B).

Immediately after the generation of the downshift command signal, the torque-up control is not yet started, and therefore the answer to the question of the step S109 is negative (NO), followed by the program proceeding to the step S111. On this occasion, when the downshift command signal has been generated, the lock-up flag FLCASOL is set to "0", and therefore the answer to the question of the step S111 is negative (NO), followed by the program proceeding to the step S15.

The time point at which the downshift command signal is generated corresponds to a time point immediately after the timer tLCDYL is set to the predetermined time period TLDCYL or before the predetermined time period TLDCYL has not elapsed after the setting, and therefore tLCDLY>0 holds when this question is first made. Then, processing at the step S116 et seq. is executed, and if the gear position command signal value SFTCMD, the engine rotational speed NE and the vehicle speed V satisfy the respective predetermined conditions at the steps S116 to S118, the lock-up flag FLCASOL is set to "1", to thereby engage the lock-up clutch 23 with a rather small engaging force. This engaging state is kept until the timer tLCDLY=0 starts to hold at the step S115 or the torque-up control is started at the step S109.

When the torque-up control is started, the downshift LC flag FDWLC is set to "1" at a step S110, followed by the program proceeding to the step S121.

At a step S124 in FIG. 4B, it is determined whether or not the torque-up control has been completed. If the torque-up control has not been completed, a down-counting timer tDWLC is set to a predetermined time period TDWLC (e.g. 25 sec) and started at a step S125, followed by terminating the present routine.

On the other hand, if the the downshift LC flag is set to "1" at the step S110, the answer to the question of the step S101 becomes negative (NO), and then the program jumps to the step S124. If the torque-up control has been completed (see a time point t13 in FIG. 5B), the lock-up flag FLCASOL is set to "1", and at the same time the control duty ratio LCBDUTY of the B solenoid valve 25b is set to a predetermined value LCBDW which is almost equal to 100% at a step S126, to thereby fully engage the lock-up clutch 23.

While the torque-up control is carried out, the gear mechanism 24 is actually in a neutral state, so that the slip of the torque converter 22 is small, and accordingly the pump impeller 22a and the turbine runner 22b are almost equal in rotational speed to each other. Therefore, even if the lock-up clutch 23 is fully engaged upon completion of the torque-up control, a shock is not generated. Further, by fully engaging the lock-up clutch 23, the slip of the torque converter is eliminated, thereby obtaining a sufficient engine brake force. Besides, if the lock-up clutch 23 is thus fully engaged, the engine rotational speed NE can be maintained at a high level, compared with a case where the lock-up clutch 23 is disengaged or engaged with a low engaging force, as shown in FIG. 5C. As a result, if the fuel cut region is set based on the engine rotational speed NE, fuel cut is continued after completion of the torque-up control to thereby curtail the fuel consumption.

At the following step S127, it is determined whether or not the count of the timer tDWLC is equal to "0", and if tDWLC>0 holds, determinations at steps S128 to S130 are executed. More specifically, it is determined at the step S128 whether or not the engine rotational speed NE is lower than a predetermined value NEDWLC (e.g. 1000 rpm). If NE>NEDWLC holds, it is determined at the step S129 whether or not the vehicle speed V is lower than a predetermined value VDWLC (e.g. 10 km/h). If V>VDWLC holds, it is determined at the step S130 whether or not the accelerator pedal opening θAP is larger than a predetermined value θAPDWLC (e.g. 3 degrees). If any of the answers to the above questions is affirmative (YES), the downshift LC flag FDWLC is set to "0" at a step S131, and then the normal LC control is executed at a step S132.

On the other hand, if the answers to the questions of the steps S128 to S130 are all negative (NO), the program is immediately terminated, and the fully engaged state of the lock-up clutch 23 is continued. Thereafter, when the predetermined time period TDWLC has elapsed and hence tDWLC=0 holds, as indicated at a time point t14 in FIG. 5D, the steps S131 and S132 are executed, followed by the program returning to the normal LC control.

As described hereinabove, according to the processing of FIGS. 4A and 4B, when the downshift command signal is generated at the time point t11, to command a downshift from the fourth-speed position to the third-speed position during deceleration of the vehicle, the control duty ratio LCBDUTY of the B solenoid valve 25b is changed to a value smaller than a normal value so as to maintain the lock-up clutch 23 engaged, at the step S119. Further, when the torque-up control is started at the time point t12, the lock-up clutch 23 is disengaged, and then, when the torque-up control is completed at the time point t13, the control duty ratio LCBDUTY is set to almost 100% to cause the lock-up clutch 23 to be almost fully engaged. Thereafter, when the predetermined time period TDWLC has elapsed, or if the engine rotational speed NE or the vehicle speed V has decreased or alternatively the accelerator pedal has been stepped on even before the lapse of the time period TDWLC at the steps S128 to S130 (time point t14), the program returns to the normal LC control.

By virtue of the torque-up control described above, the engine rotational speed NE can be prevented from sharply dropping as indicated by the dot-dash line in FIG. 5C, and therefore, if the fuel cut region is set based on the engine rotational speed NE, the fuel cut state is maintained to curtail the fuel consumption. Further, by fully engaging the lock-up clutch 23, a sufficient engine brake effect can be obtained.

Moreover, the lock-up clutch 23 is engaged with a low engaging force or pressure over a time period from the time the downshift command signal is generated to the time the torque-up control is started so that a drop in the engine rotational speed NE can be prevented, and then it can be positively increased by the following torque-up control to a level at and above which fuel cut can be carried out, to thereby curtail the fuel consumption. In other words, if the engine rotational speed NE is too low immediately before the start of the torque-up control, it cannot be sufficiently increased even if the torque-up control is effected, whereby the engine cannot enter the fuel cut region. According to the present embodiment, however, this inconvenience can be avoided, resulting in improved fuel economy.

Further, even if the engine is operating in the region where the throttle valve opening θTH is almost fully closed and the lock-up clutch 23 is to be disengaged, i.e. if the program proceeds from the step S102 to the step S111 and the answer to the question of the step S111 becomes negative (NO), the lock-up clutch 23 is engaged with a low engaging force over the predetermined time period TLCDLY, the engine rotational speed NE can be prevented from dropping immediately before the execution of the torque-up control, which makes it possible to positively increase the engine rotational speed NE to a value at and above which carrying out fuel-cut can be carried out, to thereby curtail the fuel consumption.

Figure 6:
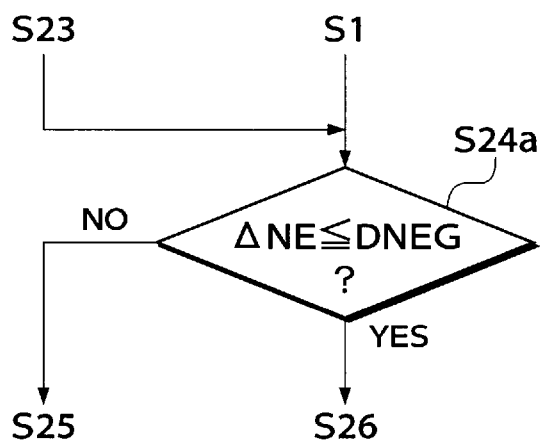
FIG. 6 is a fragmental portion of a flowchart showing a program for controlling the operation of the lock-up clutch during a downshift, according to a variation of the second embodiment.

The step S124 in FIG. 4B may be replaced by a step S124a shown in FIG. 6. That is, the timing at which the lock-up clutch 23 is switched from a disengaged state to a fully engaged state can be set to a timing at which a rate of change ΔNE in the engine rotational speed NE (=NE (present value)—NE (last value)) becomes lower than a predetermined value DNEG (e.g. a value corresponding to 100 rpm/sec). This is because the direction of change in the engine rotational speed NE turns from an increase to a decrease immediately after the torque-up control is completed.

It is desirable to generate the signal which commands termination of the torque-up control, at a timing slightly earlier than timing at which the torque-up control is to be really terminated, because the air amount actually taken into the engine does not decrease not immediately upon closure of the throttle valve, but it decreases with a small time lag.

What is claimed is:

1. A control system for an internal combustion engine with an automatic transmission having a torque converter, and a lock-up device, comprising:

engine output torque-increasing means, responsive to gear shifting of said automatic transmission, for increasing output torque of said engine so as to reduce a shock caused by said gear shifting; and engaging force control means, responsive to operation of said engine output torque-increasing means, for changing an engaging force of said lock-up device, wherein said engine has a throttle valve, said engine output torque-increasing means comprising means for increasing opening of said throttle valve.

2. A control system for an internal combustion engine with an automatic transmission having a torque converter, and a lock-up device, comprising:

engine output torque-increasing means, responsive to upshifting of said automatic transmission toward a higher speed position thereof, for increasing output torque of said engine so as to reduce a shock caused by said upshifting; and engaging force control means, responsive to operation of said engine output torque-increasing means, for increasing an engaging force of said lock-up device.

3. A control system as claimed in claim 2, wherein said engaging force control means first increases said engaging force of said lock-up device and then progressively decreases the increased engaging force.

4. A control system as claimed in claim 3, wherein said automatic transmission includes a gear device having a plurality of clutches, said engaging force control means determining timing of starting said progressive decrease of the increased engaging force of said lock-up device, depending upon engaging states of ones of said plurality of clutches which take part in said upshifting of said automatic transmission, during said upshifting of said automatic transmission.

5. A control system as claimed in any of claims 2 to 4, wherein said engaging force control means determines a required amount of increase in said engaging force of said lock-up device, depending upon at least one of an amount of increase in said output torque of said engine by said engine output torque-increasing means, rotational speed of said engine, and an upshifting pattern of said automatic transmission selected for said upshifting.

6. A control system as claimed in any of claims 2 to 4, wherein said engaging force control means determines a required amount of increase in said engaging force of said lock-up device, depending upon at least one of an operating state of said lock-up device assumed immediately before said upshifting of said automatic transmission, and an upshifting pattern of said automatic transmission selected for said upshifting.

7. A control system as claimed in any of claims 2 to 4, wherein said engaging force control means sets timing of starting said increase of said engaging force of said lock-up device to a timing earlier than a timing at which said output torque of said engine starts to be increased by said engine output torque-increasing means.

8. A control system as claimed in any of claims 2 to 4, wherein said engine has a throttle valve, said engine output torque-increasing means comprising means for increasing opening of said throttle valve.

9. A control system for an internal combustion engine for a vehicle, said engine being equipped with an automatic transmission having a torque converter, and a lock-up device, comprising:

engine output torque-increasing means responsive to downshifting of said automatic transmission toward a lower speed position thereof, for increasing output torque of said engine so as to reduce a shock caused by said downshifting;

rotational speed-detecting means for detecting rotational speed of said engine; and engaging force control means responsive to operation of said engine output torque-increasing means, for decreasing an engaging force of said lock-up device, said engaging force control means increasing the decreased engaging force of said lock-up device when a rate of change in said rotational speed of said engine after starting of said operation of said engine output torque-increasing means drops below a predetermined value.

10. A control system for an internal combustion engine for a vehicle, said engine being equipped with an automatic transmission having a torque converter, and a lock-up device, comprising:

engine output torque-increasing means responsive to downshifting of said automatic transmission toward a lower speed position thereof, for increasing output torque of said engine so as to reduce a shock caused by said downshifting; and engaging force control means responsive to completion of operation of said engine output torque-increasing means, for increasing an engaging force of said lock-up device above a value assumed during said operation of said engine output torque-increasing means.

11. A control system as claimed in claim 10, wherein said engaging force control means decreases said engaging force of said lock-up device during said operation of said engine output torque-increasing means.

12. A control system as claimed in any of claims 9 to 11, wherein said engaging force control means engages said lock-up device with a low engaging force immediately before starting of said operation of said engine output torque-increasing means.

13. A control system for an internal combustion engine for a vehicle, said engine being equipped with an automatic transmission having a lock-up device, comprising:

lock-up control means for controlling an engaging force of said lock-up device such that a slip amount of said lock-up device becomes equal to a predetermined desired value when said engine is in a particular operating region;

decelerating state-determining means for determining whether said vehicle is in a predetermined decelerating state;

operating condition-determining means for determining a change in operating state of said vehicle from said particular operating region to a region other than said particular operating region; and engine output torque-increasing means responsive to downshifting of said automatic transmission toward a lower speed position thereof, for increasing output torque of said engine so as to reduce a shock caused by said downshifting;

wherein when said downshifting of said automatic transmission is carried out while said vehicle is determined to be in said predetermined decelerating state, said lock-up control means continues said control of said engaging force of said lock-up device over a predetermined time period from the time said change in said operating state of said vehicle is determined, or over a time period from the time said change in said operating state is determined to the time said operation of said engine output torque-increasing means is started.

14. A control system for an internal combustion engine with an automatic transmission having a torque converter, and a lock-up device, comprising:

engine output torque-increasing means, responsive to upshifting of said automatic transmission toward a higher speed position thereof, for increasing output torque of said engine so as to reduce a shock caused by said upshifting; and engaging force control means, responsive to operation of said engine output torque-increasing means, for increasing an engaging force of said lock-up device, wherein said engaging force control means first increases said engaging force of said lock-up device and then progressively decreases the increased engaging force.

15. A control system as claimed in claim 14, wherein said automatic transmission includes a gear device having a plurality of clutches, said engaging force control means determining timing of starting said progressive decrease of the increased engaging force of said lock-up device, depending upon engaging states of ones of said plurality of clutches which take part in said upshifting of said automatic transmission, during said upshifting of said automatic transmission.

16. A control system as claimed in any of claims 14 or 15, wherein said engaging force control means determines a required amount of increase in said engaging force of said lock-up device, depending upon at least one of an amount of increase in said output torque of said engine by said engine output torque-increasing means, rotational speed of said engine, said an upshifting pattern of said automatic transmission selected for said upshifting.

17. A control system as claimed in any of claims 14 or 15, wherein said engaging force control means determines a required amount of increase in said engaging force of said lock-up device, depending upon at least one of an operating state of said lock-up device assumed immediately before said upshifting of said automatic transmission, and an upshifting pattern of said automatic transmission selected for said upshifting.

18. A control system as claimed in any of claims 14 or 15, wherein said engaging force control means sets timing of starting said increase of said engaging force of said lock-up device to a timing earlier than a timing at which said output torque of said engine starts to be increased by said engine output torque-increasing means.

19. A control system as claimed in any of claims 14 or 15, wherein said engine has a throttle valve, said engine output torque-increasing means comprising means for increasing opening of said throttle valve.

\* \* \* \* \*